United States Patent [19]

Johnson et al.

[11] 4,323,965
[45] Apr. 6, 1982

[54] SEQUENTIAL CHIP SELECT DECODE APPARATUS AND METHOD

[75] Inventors: Robert B. Johnson, Billerica; Chester M. Nibby, Jr., Peabody; Dana Moore, Dover, all of Mass.

[73] Assignee: Honeywell Information Systems Inc., Waltham, Mass.

[21] Appl. No.: 110,523

[22] Filed: Jan. 8, 1980

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,440,615 | 4/1969 | Carter | 364/200 |
| 4,000,485 | 12/1976 | Barlow et al. | 364/200 |
| 4,236,203 | 11/1980 | Curley et al. | 364/200 |

Primary Examiner—Raulfe B. Zache

Attorney, Agent, or Firm—Faith F. Driscoll; Nicholas Prasinos

[57] ABSTRACT

A memory subsystem which couples to a multiword bus for processing memory requests received therefrom includes at least a pair of independently addressable dynamic memory module units. Each memory unit includes a number of rows of random access memory (RAM) chips. The subsystem receives as part of each memory request an address, the least significant portion of which selects the row of chips to be accessed within one of the pair of memory units. Address decode circuits include gating circuits which couple to both module units. The gating circuits are interconnected so that the decoding of the least significant address bits results in the generation of a pair of row address strobe signals. These signals enable simultaneously the rows of RAM chips for access within both module units for read out of information to a multiword bus eliminating any delay in address incrementing.

38 Claims, 9 Drawing Figures

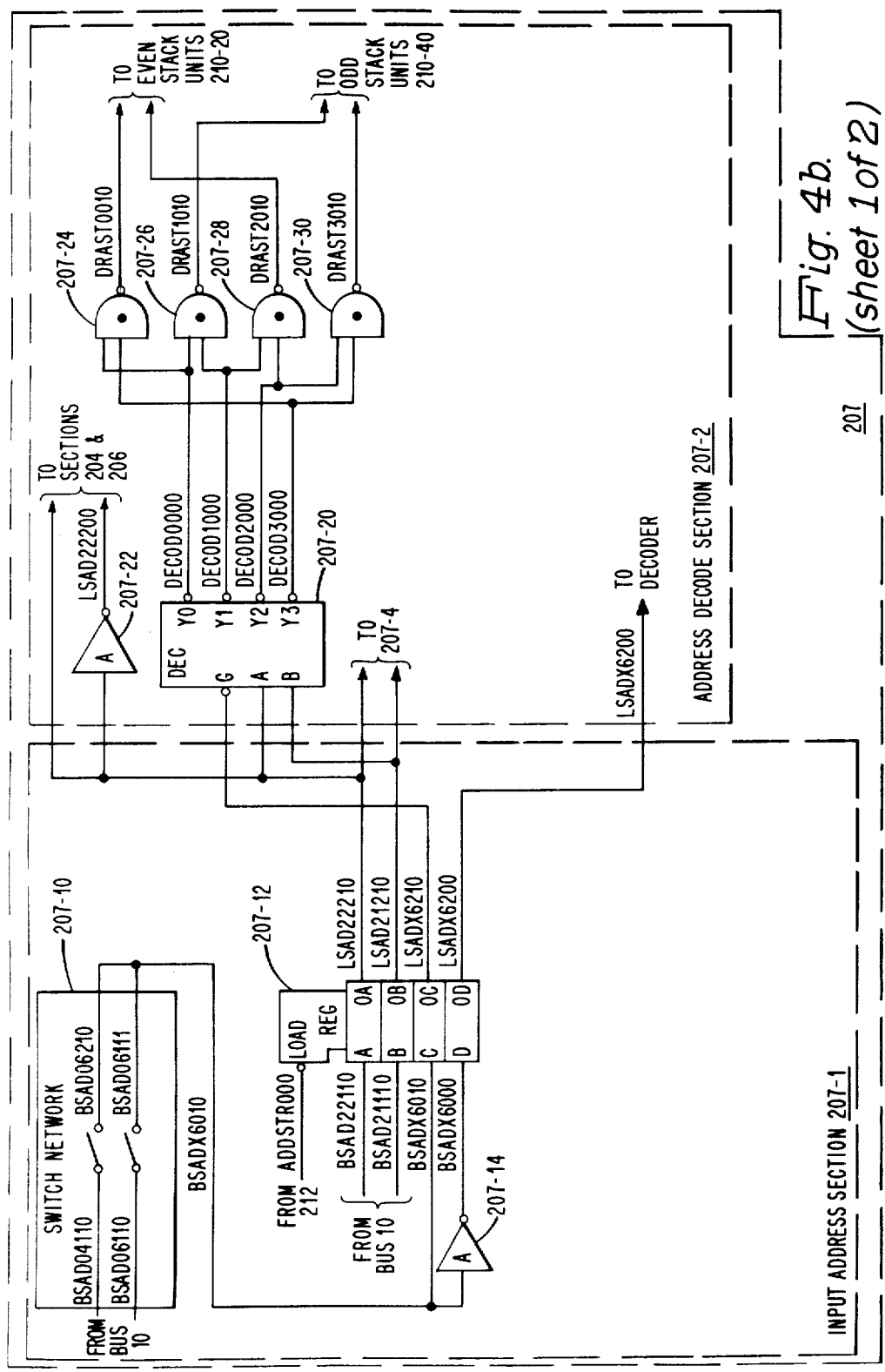
Fig. 4b. (sheet 1 of 2)

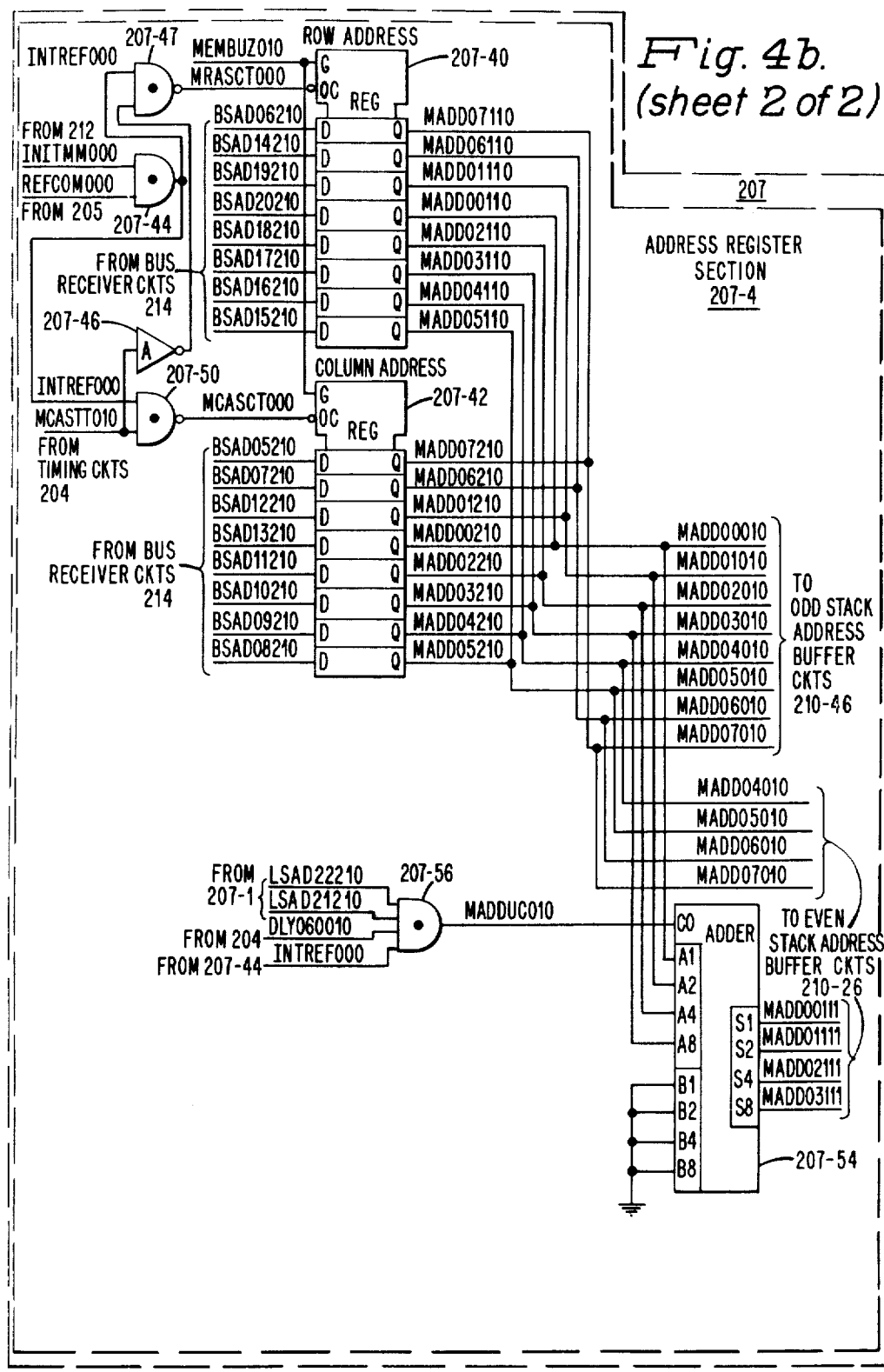
Fig. 4b. (sheet 2 of 2)

SEQUENTIAL CHIP SELECT DECODE APPARATUS AND METHOD

RELATED APPLICATIONS

1. "Sequential Word Aligned Address Apparatus" invented by Robert B. Johnson, Chester M. Nibby, Jr. and Dana W. Moore, Ser. No. 110,521, filed on Jan. 8, 1980 and assigned to the same assignee as named herein.
2. "Low Cost Double Word Fetch System" invented by Robert B. Johnson, Chester M. Nibby, Jr. and Dana W. Moore, Ser. No. 110,522, filed on Jan. 8, 1980 and assigned to the same assignee as named herein.
3. "Multimode Memory System" invented by Robert B. Johnson and Chester M. Nibby, Jr., Ser. No. 110,520, filed on Jan. 8, 1980 and assigned to the same assignee as named herein.

BACKGROUND OF THE INVENTION

1. Field of Use

This invention relates to memory systems containing semiconductor memory elements including those in which stored information must be periodically refreshed to preserve the integrity of such information.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in the copending patent application "System Providing Multiple Fetch Bus Cycle Operation", invented by John L. Curley, Robert B. Johnson, Richard A. Lemay and Chester M. Nibby, Jr., Ser. No. 867,270, filed on Jan. 5, 1978 now U.S. Pat. No. 4,236,203, issued on Nov. 25, 1980 and assigned to the same assignee as named herein.

In the above prior art system, the memory system connects to an asynchronously operated single word wide bus. In the arrangement, a request for multiple words is made in a single bus cycle and the requested information words are delivered to the bus over a series of response cycles. While this arrangement improves the system throughput capabilities, it becomes desirable to be able to provide access to both words simultaneously over a single bus.

It will be noted that in such paired memory module systems, it is necessary to generate and decode even and odd addresses for accessing both memory modules. Such an arrangement for accomplishing the generation/decoding is described in copending patent application "A Dynamic Memory System which Includes Apparatus for Performing Refresh Operations in Parallel with Normal Memory Operations", invented by Robert B. Johnson and Chester M. Nibby, Jr., Ser. No. 926,480, filed on July 20, 1978 now U.S. Pat. No. 4,185,323, issued on Jan. 22, 1980 and assigned to the same assignee as named herein.

In the above arrangement, the low order bits of the address provided with the memory request specify the storage location being accessed while the high order bits specify which row of RAM chips is being selected. In order to fetch the second word of the pair being accessed, it is necessary to increment by one the memory request address and then decode the incremented address. This results in additional delay in generating the required address increasing the overall time in delivering the requested word pair to the bus. Moreover, it also necessitates additional counter or incrementing circuits.

Accordingly, it is an object of the present invention to provide a memory system which provides for read out of a plurality of words from a corresponding number of memory modules with minimum delay.

It is a further object of the present invention to provide a method and apparatus which minimizes the circuitry and delay for providing at least a pair of words from a memory system which couples to a multiword bus.

SUMMARY OF THE INVENTION

The above and other objects are achieved in a preferred embodiment of the preferred embodiment of the memory subsystem of the present invention which includes at least a pair of independently addressable memory module units which operatively couple to a multiword bus. Each memory module unit includes a number of rows of random access memory (RAM) chips.

According to the present invention, the address associated with each memory request received by the memory subsystem is coded so that the least significant or low order address bits specify which row of RAM chips contains the first word to be accessed. The most significant or high order address bits specify the storage location containing the word to be accessed.

The memory subsystem further includes address decode circuits which include a number of gating circuits which couple to both memory module units. The number of gating circuits are interconnected so that the decoding of the least significant address bits results in the generation of a pair of sequential row address strobe (RAS) signals. These signals enable simultaneously access to a row of RAM chips within both memory modules. Therefore, the memory subsystem provides a multiword output to the multiword bus within a minimum of time.

In greater detail, in the preferred embodiment includes at least one set of gating circuits. A decoder circuit which is connected to decode the least significant address bits has each of its outputs connected to the inputs of different predetermined pairs of gating circuits. This enables the decoder circuit to enable the appropriate pair of gating circuits upon decoding the least significant address bits of the memory request address. For example, when the least significant address bits specify the selection of the first row of RAM chips (i.e., RAS0), the decoder circuit also causes the set of gating circuits to generate a select signal specifying the next sequential row of RAM chips (i.e., RAS1). The even row select signals are applied to one of the memory modules while the odd row select signals are applied to the other memory module.

The pair of generated select signals in the above arrangement simultaneously enables for access the appropriate row of chips within each memory module. This eliminates the need for address incrementing followed by further address decoding. Also, this minimizes the amount of circuits while providing the desired pair of words to a multiword bus.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4a through 4c illustrate in greater detail different portions of the memory subsystem 20 of FIG. 3.

GENERAL DESCRIPTION OF SYSTEM OF FIG. 1

Figure 1:
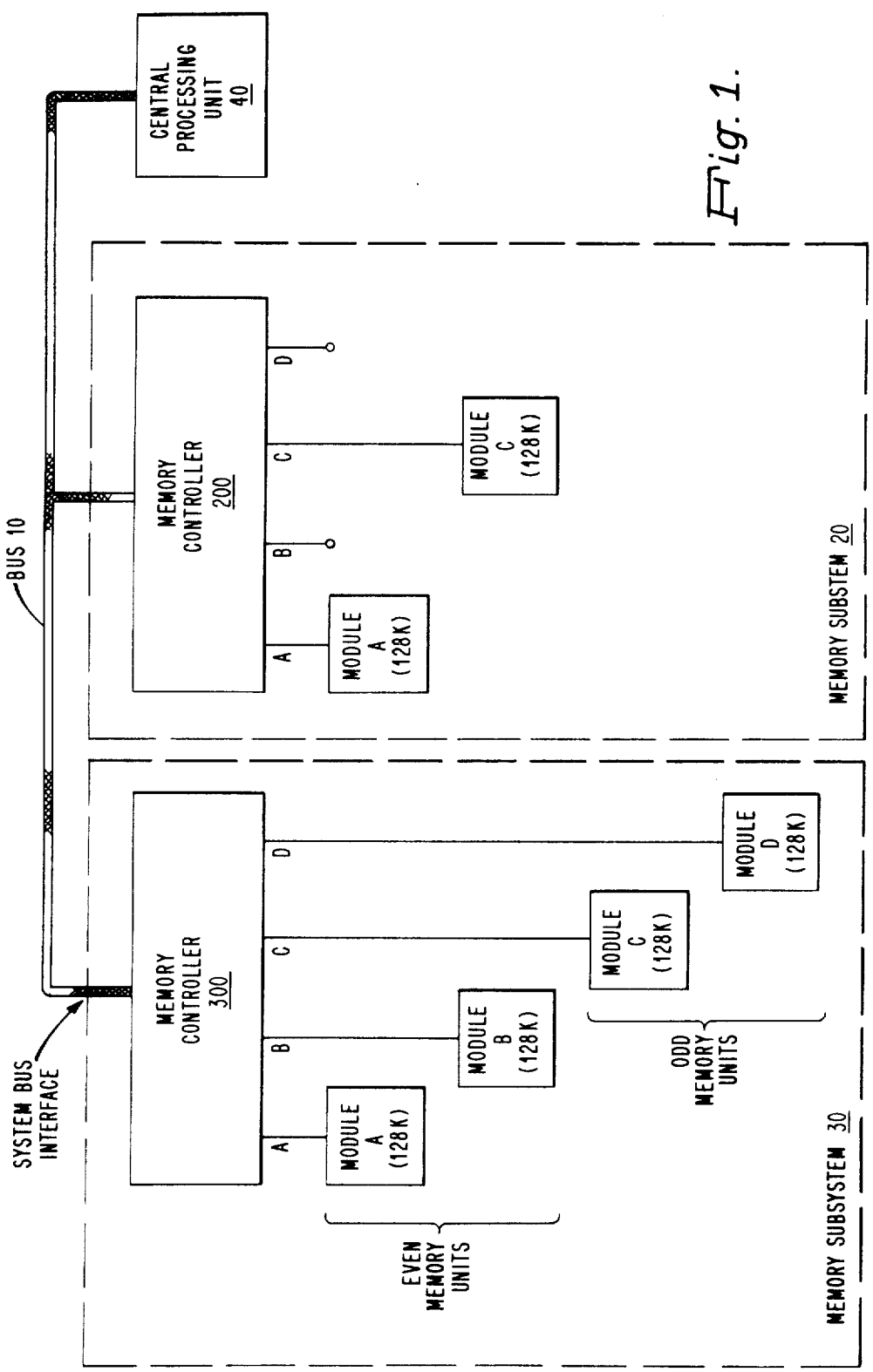
FIG. 1 shows in block diagram form a system which incorporates the principles of the present invention.

FIG. 1 illustrates a data processing system which includes the apparatus of the present invention. Referring to the figure, it is seen that the system includes a multiline bus 10 coupled to a plurality of memory subsystems 20 and 30 and to a central processing unit (CPU) 40. It will be appreciated that the system of FIG. 1 will normally include other units such as those disclosed in U.S. Pat. No. 4,000,485 issued Dec. 28, 1976. The memory subsystems 20 and 30, each include a memory controller which can address up to four memory module units. In FIG. 1, memory controller 200 is connected to address the module units labeled A and C while memory controller 300 is connected to address the module units labeled A through D.

The CPU 40 is a microprogrammed processing unit which may for the purposes of the present invention may be considered conventional in design. The copending patent application cited above in addition to the patent application "System Providing Multiple Outstanding Information Requests", invented by Richard A. Lemay and John L. Curley, Ser. No. 867,266, filed Jan. 5, 1978 and assigned to the same assignee as named herein may be consulted for further details.

The CPU 40 and memory subsystems 20 and 30 communicate over the bus 10 in a predetermined manner as set forth in U.S. Pat. No. 4,000,485. Briefly, a unit wishing to communicate requests a bus cycle and when the bus cycle is granted, the unit becomes the "master" and is able to address any other unit in the system as the "slave". In cases of those bus exchanges which require a response (e.g. memory read operation), the requesting unit as "master" identifies itself and indicates to the "slave" unit that a response is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines discussed in connection with FIG. 2, a unit is able to designate to the other unit, the type of cycle or operation being initiated or performed.

MEMORY SUBSYSTEM INTERFACE

Figure 2:
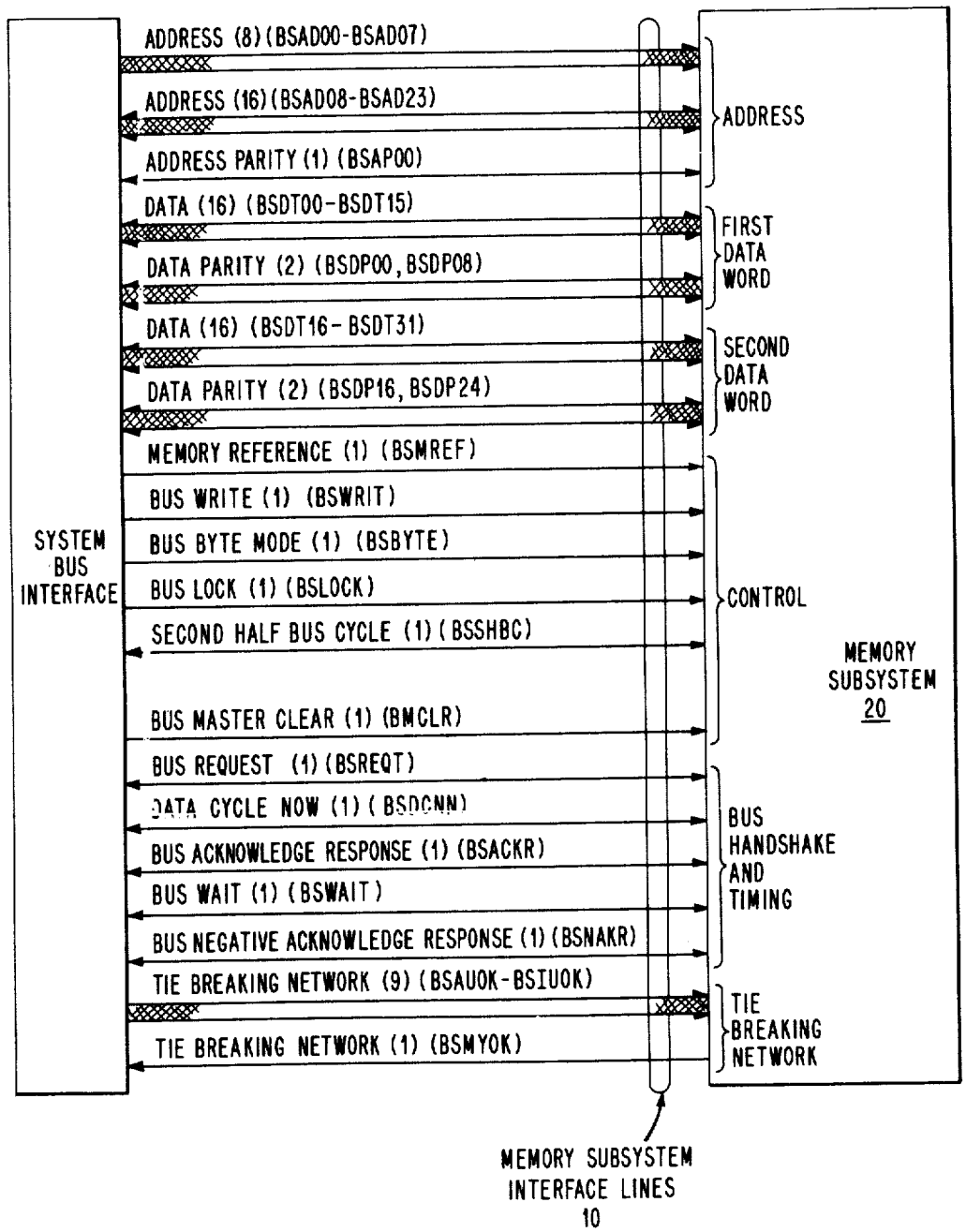
FIG. 2 shows in detail the lines of the system bus 10 which connect to the memory subsystem of FIG. 1.

FIG. 2 shows the lines which constitute the interface between each memory subsystem and bus 10. As shown, bus 10 includes a number of address lines (BSAD00-23, BSAP-00), two sets of data lines (BSDT00-15, BSDP00, BSDP08) and (BSDT16-31, BSDP16, BSDP24), a number of control lines (BSMREF-BSMCLR), a number of timing lines (BSREQT-BSNAKR) and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00-BSAD23 | The bus address lines constitute a twenty-four bit wide path used in conjuction with the bus memory reference line BSMREF to transfer a 24-bit address to subsystem 20 or a 16-bit identifier from subsystem 20 to bus 10 (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23=1= right byte; BSAD23=0=left byte). When used for identification, lines BSAD00-BSAD07 are not used. The lines BSAD08-BSAD23 carry the identification of the receiving unit as transmitted to subsystem 20 during the previous memory read request. |
| BSAP00 | The bus address parity line is a bidirectional line which provides an odd parity signal for the address signals applied to lines BSAD00-BSAD07. |
| | Data Lines |
| BSDT00-BSDT15, BSDT16-BSDT31 | The sets of bus data lines constitute a 32-bit or two word line bidirectional path for transferring data or identification information between subsystem 20 and bus 10 as a function of the cycle of operation being performed. During a write cycle of operation, the bus data lines transfer information to be written into memory at the location specified by the address signals applied to lines BSAD00-BSAD23. During the first half of a read cycle of operation, the data lines transfer identification information (channel number) to the subsystem 20. During the second half of the read cycle, the data lines transfer the information read from memory. |
| BSDP00, BSDP08, BSDP16, BSDP24 | The bus data parity lines are two sets of bidirectional lines which provide odd parity signals coded as follows: BSDP00=odd parity for signals applied to lines BSDT00-BSDT07 (left byte), BSDP08=odd parity for signals applied to lines BSDT08-BSDT15 (right byte); |

MEMORY SUBSYSTEM INTERFACE LINES

| Designation | Description |
|---|---|
| | BSDP16 = odd parity for signals applied to lines BSDT16–BSDT23; and |
| | BSDP24 = odd parity signals applied to lines BSDT24–BSDT31. |
| | Control Lines |
| BSMREF | The bus memory reference line extends from bus 10 to the memory subsystem 20. When set to a true state, this line signals the subsystem 20 that the lines BSAD00–BSAD23 contain a complete memory controller address and that it is performing a write or read operation upon the specified location. When reset to a false state, the line signals subsystem 20 that the lines BSAD00–BSAD23 contain information directed to another unit and not subsystem 20. |
| BSWRIT | The bus write line extends from the bus 10 to the memory subsystem 20. This line when set to a true state, in conjuction with line BSMREF being true, signals subsystem 20 to perform a write cycle of operation. When reset to a false state, this line, in conjuction with line BSMREF being true, signals subsystem 20 to perform a read cycle of operation. |
| BSBYTE | The bus byte line extends from bus 10 to subsystem 20. This line, when set to a true state, signals subsystem 20 that it is to perform a byte operation rather than a word operation. |
| BSLOCK | The bus lock line extends from bus 10 to subsystem 20. When set to a true state, this line signals subsystem 20 of a request from central processor 40 to test or change the status of a memory lock flip-flop included within the controller 200. |
| BSSHBC | The bus second half bus cycle line is used to signal a unit that the current information applied to bus 10 by subsystem 20 is the information requested by a previous read request. In this case, both subsystem 20 and the unit receiving the information are busy to all units from the start of the initiation cycle until subsystem 20 completes the transfer. This line is used in conjunction with the BSLOCK line to set or reset its memory lock flip-flop. When a unit is requesting to read or write and line BSLOCK is true, the line BSSHBC, when true, signals subsystem 20 to reset its lock flip-flop. When in a false state, it signals subsystem 20 to test and set its lock flip-flop. |
| BSMCLR | The bus master clear line extends from bus 10 to subsystem 20. When this line is set to a true state, it causes the subsystem 20 to clear to zeros certain bus circuits within controller 200. |
| | Bus Handshake/Timing Lines |
| BSREQT | The bus request line is a bidirectional line which extends between bus 10 and subsystem 20. When set to a true state, it signals the subsystem 20 that another unit is requesting a bus cycle. When reset to a false state, it signals subsystem 20 that there is no bus pending bus request. This line is forced to a true state by subsystem 20 to request a read second half bus cycle. |
| BSDCNN | The data cycle line is a bidirectional line which extends between bus 10 and subsystem 20. When forced to a true state, the line signals the subsystem 20 that a unit was granted a requested bus cycle and placed information on the bus for another unit. The subsystem 20 forces the line to a true state to signal that it is transmitting requested data back to a unit. Prior to this, subsystem 20 had requested and been granted a bus cycle. |
| BSACKR | The bus acknowledge line is a bidirectional line which extends between the bus 10 and subsystem 20. When set to a binary ONE by subsystem 20, the line signals that it is accepting a bus transfer during a read first half bus cycle or write cycle. During a read second half bus cycle, this line when set to a binary ONE by the unit which originated the request signals the subsystem 20 of its acceptance of a transfer. |
| BSWAIT | The bus wait line is a bidirectional line which extends between bus 10 and subsystem 20. When set to a true or binary ONE state by subsystem 20, it signals a requesting unit that the subsystem cannot accept a transfer at this time. Thereafter, the unit will initiate successive retries until the subsystem 20 acknowledges the transfer. The subsystem 20 sets the BSWAIT line true under the following conditions:<br>1. It is busy performing an internal read or write cycle of operation.<br>2. It is requesting a read second half bus cycle.<br>3. It is anticipating a refresh operation.<br>4. It is performing a refresh operation.<br>5. It is busy when placed in an initialize mode.<br>When the BSWAIT line is set to a true or binary ONE state by a unit, this signals the subsystem 20 that the data is not being accepted by the requesting unit and to terminate its present bus cycle of operation. |
| BSNAKR | The bus negative acknowlege line is a bidirectional line which extends between the bus 10 and subsystem 20. When this line is set to a true or binary ONE state by subsystem 20, it signals that it is refusing a specified transfer. The subsystem 20 sets line BSNAKR to a true state as follows:<br>1. Memory lock flip-flop is set to a binary ONE, and<br>2. The request is to test and set the lock flip-flop (BSLOCK true and BSSHBC false). |

| MEMORY SUBSYSTEM INTERFACE LINES | |
|---|---|
| Designation | Description |
| | In all other cases, when the memory lock flip-flop is set, subsystem 20 generates a response via the BSACKR line or the BSWAIT line or generates no response. When the BSNAKR line is forced true by a unit, this signals subsystem 20 that the data is not accepted by the unit and to terminate its cycle of operation. |
| | Tie Breaking Control Lines |
| BSAUOK-BSIUOK | The tie breaking network lines extend from bus 10 to subsystem 20. These lines signal subsystem 20 whether units of higher priority have made bus requests. When all the signals on these lines are binary ONES, this signals subsystem 20 that it has been granted a bus cycle at which time it is able to force the BSDCNN line to a binary ONE. When any one of the signals on the lines is a binary ZERO, this signals subsystem 20 that it has not been granted a bus cycle and is inhibited from forcing line BSDCNN to a binary ONE. |
| BSMYOK | The tie breaking network line extends from subsystem 20 to bus 10. Subsystem 20 forces this line to a false or binary ZERO state to signal other units of lower priority of a bus request. |

Memory Subsystem 20

Figure 3:
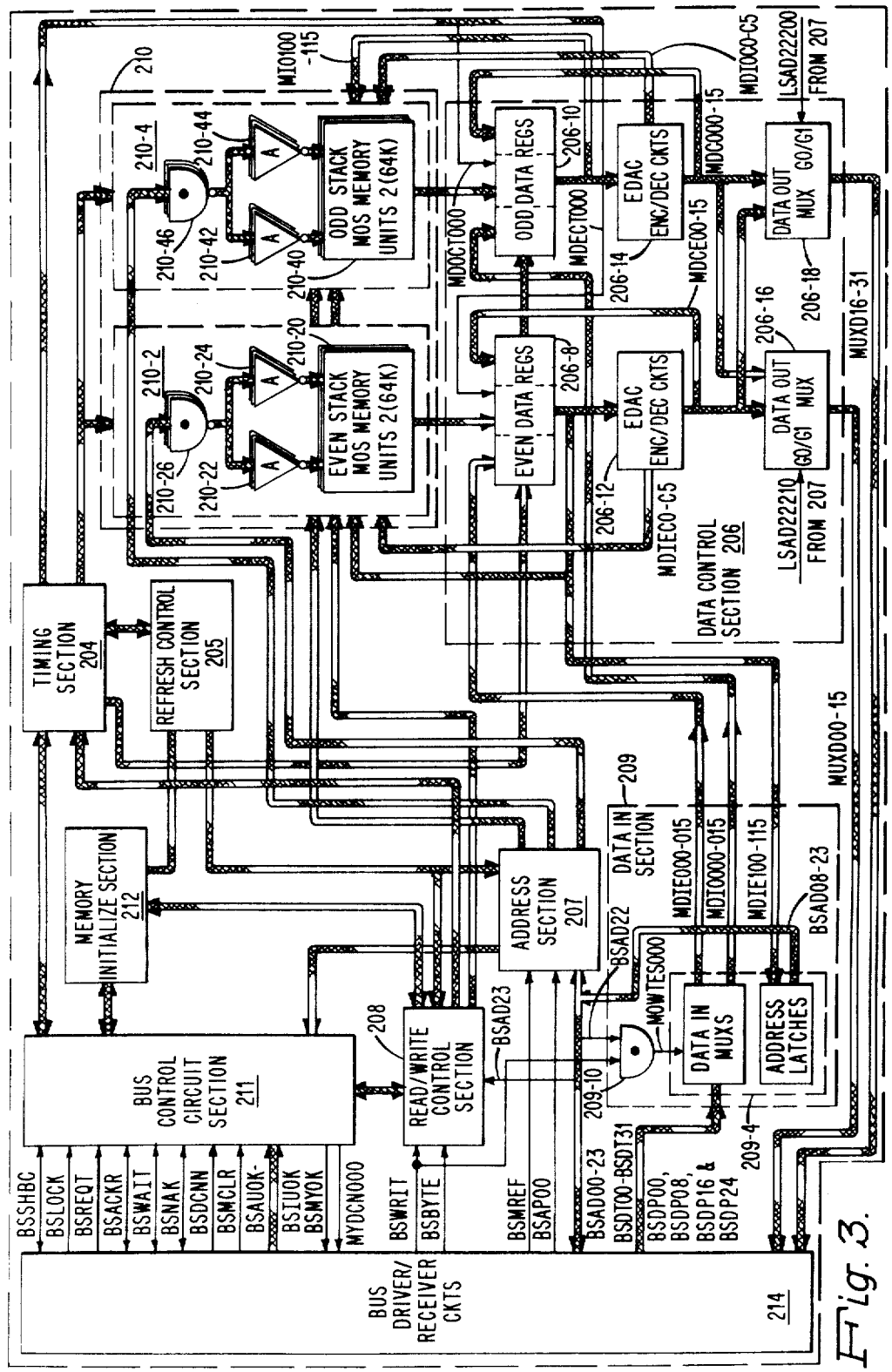
FIG. 3 shows in block diagram form, the memory subsystem 20 of FIG. 1.

FIG. 3 shows a preferred embodiment of a memory subsystem which is constructed using the principles of the present invention. Referring to FIG. 3, it is seen that subsystem 20 includes a memory controller 200 which controls the two 128K word memory module units 210-2 and 210-4 of memory section 210. The module units of blocks 210-2 and 210-4 include high speed MOS random access memory integrated circuits designated by blocks 210-20 and 210-40, and address buffer circuits designated by blocks 210-22 through 210-46. Each 128K memory unit is constructed from 64K word by one bit dynamic MOS RAM chips illustrated in greater detail in FIG. 4c. More specifically, referring to FIG. 4c, it is seen that each 128K by 22 bit memory module includes forty-four 65,534 (64K) word by one bit chips. Within each chip there are a number of storage arrays organized in a matrix of 256 rows by 256 columns of storage cells.

The controller 200 includes those circuits required to generate memory timing signals, perform refresh operations, data transfer operations, address distribution and decoding operations and bus interface operations. Such circuits are included as part of the different sections of FIG. 3.

The sections include a timing section 204, a refresh control section 205, a data control section 206, an address section 207, a read/write control section 208, a data in section 209, a bus control circuit section 211 and memory initialize circuit section 212.

The bus control section 211 includes the logic circuits which generate signals for generating and accepting bus cycle requests for single and double wide word operations. As seen from FIG. 3, these circuits as well as the circuits of other sections are connected to bus 10 via driver and receiver circuits, conventional in design. It will be noted that the binary ONE and ZERO states of the signals on bus 10 and those utilized within sybsystem 20 differ. The bus signals operate with negative logic while the subsystem 20 utilizes positive logic. The section 211 includes the tie breaking network circuits which resolves request priority on the basis of a unit's physical position for the bus. The memory subsystem 20, located at the left most or bottom position, is assigned the highest priority while the CPU 40, located at the highest most or top position, is assigned the lowest priority. For further information regarding bus operation, reference may be made to the above mentioned U.S. patents and U.S. patent applications.

The timing section 204, shown in detail in FIG. 4b, includes circuits which generate the required sequence of timing signals for memory read and write cycles of operation. As seen from FIG. 3, this section transmits and receives signals to and from sections 205, 206, 207, 208 and 211.

In accordance with the present invention, the address section 207, shown in greater detail in FIG. 4b, includes circuits which decode, generate and distribute address signals required for initialization and read/write selection. The section 207 receives address signals from lines BSAD00-BSAD23 and BSAP00 in addition to the memory reference control signal from the BSMREF line. Additionally, section 207 receives control and timing signals from sections 204 and 212.

The memory initialize section 212 includes circuits, conventional in design, for clearing the memory subsystem circuits to an initial or predetermined state.

The read/write control section 208 includes register and control logic circuits, conventional in design. The register circuits receive and store signals corresponding to the states of the BSWRIT and BSBYTE control lines and the address line BSAD23. The control circuits decode the signals from register circuits and generate signals applied to sections 204,207 and 210 for establishing whether the subsystem is to perform a read, write or a read followed by a write cycle of operation (i.e., for a byte command).

The refresh section 205 includes the circuits for periodically refreshing the contents of memory. Section 205 receives timing and control signals from section 204 and provides control signals to sections 204, 207, 208 and 212.

The data in section 209 circuits of block 209-4 include a pair of multiplexer circuits and an address register which is connected to receive signals from section 206.

The multiplexer circuits, conventional in design, receive data words from the two sets of bus lines BSDT00-15 and BSDT16-31 and apply the appropriate words via the sets of output lines MDIE000-015 and MDIO000-015 to the correct memory modules during a write cycle of operation. That is, multiplexer circuits are selectively enabled by signal MOWTES000 generated by an AND gate 209-10. The AND gate 209-10 generates signal MOWTES000 as a function of bus address bit 22 (i.e., signal BSAD22) and whether the memory subsystem is doing a write operation (i.e., signal BSWRIT). During a write operation, signal MOWTES000 applies the correct data word (i.e., the word applied to bus lines BSDT00-15 or BSDT16-31) into the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be with the module identification information transmitted via the bus lines BSDT00-15. Since this is not pertinent to an understanding of the present invention, it will not be further discussed herein.

For further information regarding the above arrangement, reference may be made to the related patent application "Sequential Word Aligned Addressing Apparatus".

The data control section 206 includes the registers 206-8 and 206-10 and data out multiplexer circuits 206-16 and 206-18. These circuits enable data to be written into and/or read from the odd and even memory units 210-20 and 210-40 of section 210 under the control of signals from sections 204 and 207. During a read cycle of operation, operand or instruction signals are read out simultaneously from the units 210-20 and 210-40 into the even data and odd data registers 206-8 and 206-10. During a write cycle of operation, operand signals are loaded into the even data and odd data registers 206-8 and 206-10 from section 209 and written into the memory units of section 210.

For the ease of illustration, the even data and odd data registers 206-8 and 206-10 are shown as a single block. However, it should be understood that these registers actually are made up of three distinct registers represented by the dotted lines in each block. The reason is that multiple registers are required for using the EDAC generation and correction logic circuits during both read and write cycles.

It will be noted that the outputs of these registers connect in common. In order to provide the appropriate transfers of data during read, write and byte write operations, the appropriate register is enabled by the tristate control. As explained herein, such registers are constructed from D type transparent latch circuits such as those designated as SN74S373 manufactured by Texas Instruments Incorporated. In the case of a read operation, this enables the address ID information received from the bus 10 to be transferred to the address latches of block 209-4. For the purposes of the present invention, it can be assumed that the appropriate data register is enabled during the processing of memory requests.

The section 206 further includes an error detection and correction (EDAC) capability wherein each word contains 16 data bits and 6 check bits used to detect and correct single bit errors in the data words and detect and signal without correction, double bit errors in the data word.

The EDAC capability is provided by the EDAC encoder/decoder circuits 206-12 and 206-14. These circuits, as shown, connect to the even and odd data registers 206-8 and 206-10. During read and write cycles of operation, they perform the required encoding and decoding operations. The encoder/decoder circuits may be considered conventional in design and may for example take the form of those circuits disclosed in U.S. Pat. No. 4,072,853 which issued Feb. 7, 1978.

DETAILED DESCRIPTION OF CONTROLLER SECTIONS

Only those sections which are believed necessary to an understanding of the present invention are described herein. For further information regarding the remaining sections, reference may be made to the related patent applications or to copending patent application "A Dynamic Memory System which Includes Apparatus for Performing Refresh Operations in Parallel with Normal Memory Operations".

Section 204

Figure 4A:
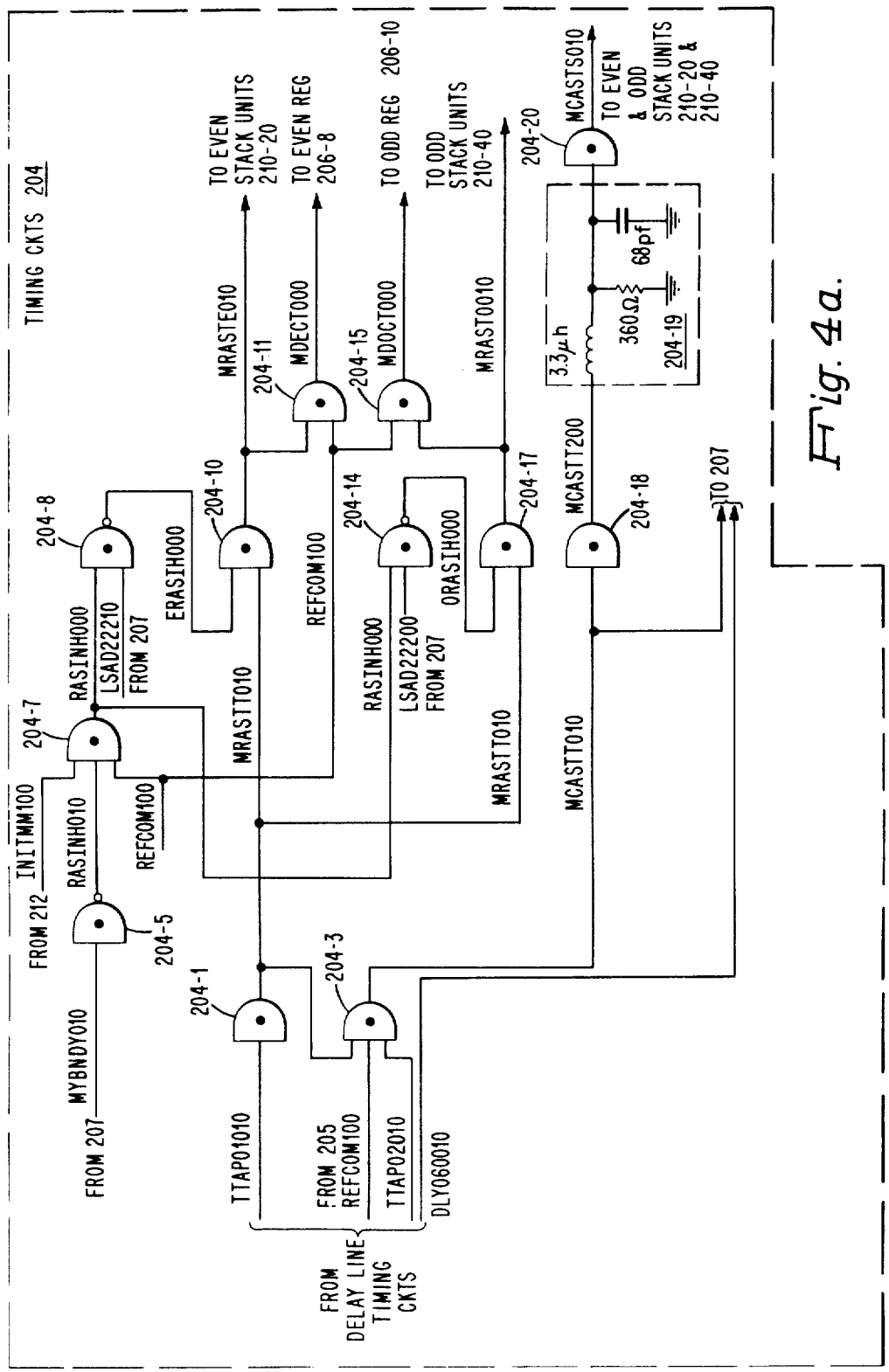

FIG. 4a illustrates in greater detail, the timing circuits of section 204. The circuits receive input timing pulse signals TTAP01010 and TTAP02010 from delay line timing generator circuits, not shown, conventional in design. The timing generator circuits generate a series of timing pulses via a pair of series connected 200 nanosecond delay lines in response to the signal MYACKR10 being switched to a binary ONE. These pulses in conjunction with the circuits of block 204 establish the timing for the remaining sections during a memory cycle of operation.

Additionally, the circuits of block 204 receive a boundary signal MYBNDY010, address signals LSAD22200 and LSAD22210 from section 207. Also, section 212 applies an initialize signal INITMM100 to section 204. For the purposes of the present invention, signal MYBNDY010 can be considered to be always in a binary ONE state. The signal MYBNDY010 is applied to a NAND gate 204-5 which forces signal RASINH010 to a binary ZERO. The series connected AND gate 204-7 logically combines initialize signal INITMM100, refresh command signal REFCOM100 generated by circuits within section 204, not shown, to produce signal RASINH000. A NAND gate 204-8 combines signals RASINH000 and address signal LSAD22210 to produce an even row strobe inhibit signal ERASIH000. The signal is applied to an AND gate 204-10 for combining with a timing signal MRASTT010 derived from signal TTAP01010 via an AND gate 204-1. The result output signal MRASTE010 is applied to the RAS timing input of the even stack units 210-20.

A NAND gate 204-14 combines signals RASINH000 and LSAD222000 to produce an odd row inhibit signal ORASIH000. This signal is combined in an AND gate 204-17 with timing signal MRASTT010 to generate row timing signal MRAST0010. This signal is applied to the RAS timing input of the odd stack units 210-40.

As seen from FIG. 4a, an AND gate 204-11 applies a timing signal MDECT000 to the even data register 206-8 in the absence of a refresh command (i.e., signal REFCOM100=0). Similarly, an AND gate 204-15 applies a timing signal MDOCT000 to the odd data register 206-10. The delay network 204-19 which connects in series with AND gates 204-3, 204-18 and 204-20 generate timing signal MCASTS010. The signal MCASTS010 is applied to the CAS timing input of the even and odd stack units 210-20 and 210-40.

Section 207

FIG. 4b illustrates the different sections of address section 207. As shown, section 207 includes an input address section 207-1, an address decode section 207-2 and an address register section 207-4. The input address section 207-1 includes a set of manually selectable switches of block 207-10 which receive bus address signals BSAD04110 and BSAD06110. These switches select the high order bus address bit which selects the upper/lower 256K of memory when the system includes the full complement of 128K memory modules (i.e., modules A–D). When the memory modules are constructed using 64K chips, the top switch is placed in the closed position. This selects address bit 4 (signal BSAD04110) as the high order bus address bit. For 16K chips, the other switch is placed in the closed position which selects address bit 6.

Since it is assumed that the memory modules use 64K chips, the top switch is closed while the other switch is opened. The resulting high order bit signal BSADX6010 in addition to its complement along with the least significant bus address bits 22 and 21 are stored in a register 207-12. An inverter circuit 207-14 generates complement signal BSADX6000. The four signals are loaded into register 207-12 when address strobe signal ADDSTR000 is forced to a binary ZERO. This occurs when the memory is busy (i.e., accepts a bus cycle/a memory request).

The outputs of register 207-12 are applied as inputs to the section 207-2 in addition to sections 204 and 206. More specifically, the least significant address bit signals LSAD22210 and LSAD21210 are applied to the input terminals of a binary decoder circuit 207-20. The least significant bit address signal LSAD22210 and its complement signal LSAD22200 generated by an inverter circuit 207-22 are applied to sections 204 and 206. The high order bit signal LSADX6210 is applied to the enable/gate input terminal of decoder circuit 207-20. The complement signal LSADX6200 is applied to the enable/gate input of another decoder circuit, not shown, together with address signals LSAD22210 and LSAD21210. This circuitry has been omitted since it is assumed that the controller being described includes two memory modules. This means that high order address signal LSADX6210 is always a binary ZERO. Therefore, decoder circuit 207-20 is always enabled for operation.

Each of the four decode outputs DECOD0000 through DECOD3000 connects to a different pair of the NAND gates 207-24 through 207-30. It will be noted that the zero decode signal DECOD0000 connects to the inputs of NAND gates 207-24 and 207-26 which generate the 0 and 1 row address strobe signals. Similarly, the 1 decode signal DECOD1000 connects to the inputs of NAND gates 207-26 and 207-28 which generate the 1 and 2 row address strobe signals. The next sequential decode signal DECOD2000 connects to the two NAND gates which generate the next pair of sequential row address strobe signals. Lastly, the last decode signal DECOD3000 connects to NAND gates 207-30 and 207-24 which generate the 3 and 0 row address strobe signals.

As shown, the even row address strobe signals DRAST0010 and DRAST2010 are applied to the RAM chips of the even stack units 210-20. The odd row address strobe signals DRAST1010 and DRAST3010 are applied to the RAM chips of the odd stack units 210-40.

The address register section 207-4 of section 207 is included for the sake of completeness. The apparatus of this section forms a part of the subject matter of copending patent application "Sequential Word Aligned Addressing Apparatus" previously referenced. Therefore, this section will only be discussed to the extent necessary for a complete understanding of the present invention.

FIG. 4b shows that the bus address signals BSAD05210 through BSAD20210 are applied via the bus receiver circuits of block 214 of FIG. 3 as inputs to different stages of a row address register 207-40 and a column address register 207-42. The enabling gate input terminals of both registers are connected to receive a memory busy signal MEMBUZ010 from section 204. The OC input terminal of row address register 207-40 is connected to receive a timing signal MRASCT000 generated by AND gate 207-44, inverter circuit 207-46 and NAND gate 207-47 in response to signals INITMM000, REFCOM000 and MCASTT010. The OC input terminal of column address register 207-42 is connected to receive a timing signal MCASCT000 generated by NAND gate 207-44 and NAND gate 207-50 in response to signals INITMM000, REFCOM000 and MCASTT010.

Each of the address registers 207-40 and 207-42 are constructed from D type transparent latch circuits such as those designated as SN74S373 manufactured by Texas Instruments Incorporated. The register circuits are transparent meaning that while the G input terminal is a binary ONE, the signals at the Q output terminals follow the signals applied to the D input terminals. As seen from FIG. 4b, the different address output terminals of the registers of each set are connected in common in a wired OR arrangement for enabling the multiplexing of these address signals. Such multiplexing is accomplished by controlling the state of the signals applied to the output control (OC) input terminals of the registers 207-40 and 207-42.

More specifically, the output control (OC) terminals enable so-called tristate operation which are controlled by the circuits 207-44 through 207-50. When each of the signals MRASCT000 and MCASCT000 is in a binary ONE state, this inhibits any address signal from being applied at the Q output terminals of that register. However, this operation is independent of the latching action of the register flip-flops. Additionally, section 207-4 includes a 4-bit binary full adder circuit 207-54, conventional in design. The adder circuit 207-54 is connected to increment by one, the low order address bits 20 through 17. In greater detail, the input terminal A1-A8 receive signals MADD00110 through MADD03110. Binary ZERO signals are applied to input terminals B1-B8. An AND gate 207-56 generates a carry in signal MADDUC010 as a function of the states of the least significant address signals LSAD22210 and LSAD21210, signal INTREF000 and timing signal DLY060010.

Figure 4C:
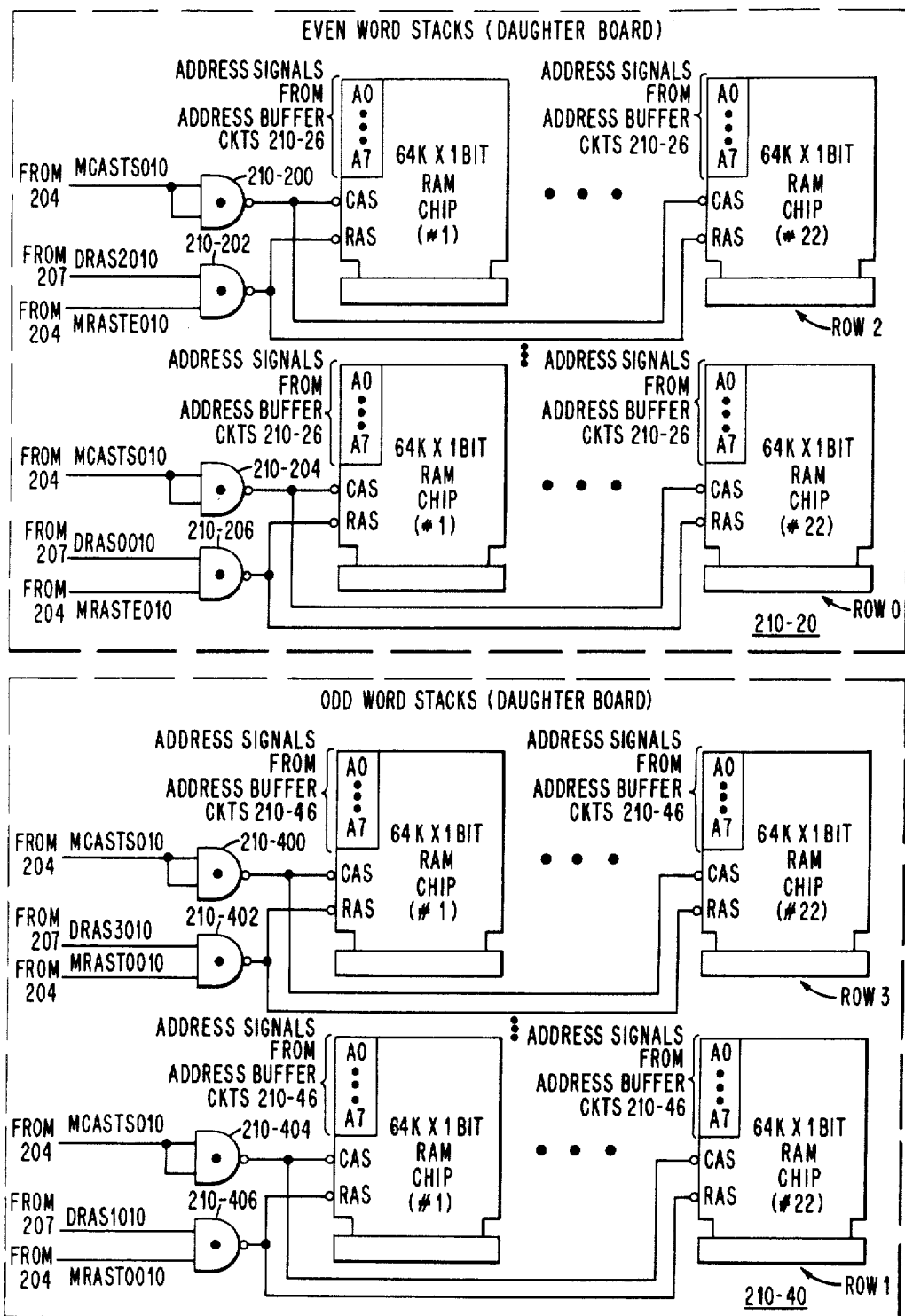

The incremented output signals MADD00111 through MADD0311 appearing at adder sum terminals S1-S8 are applied via address buffer circuits 210-26 to the even stack RAM chips of FIG. 4c. The same is true of signals MADD04010 through MADD07010. The odd stack RAM chips of FIG. 4c are connected to receive the address signals MADD0010 through MADD07010 via address buffer circuits 210-46.

Memory Units 210-20 and 210-40—FIG. 4c

As previously discussed, the even word and odd word stacks of blocks 210-20 and 210-40 are shown in greater detail in FIG. 4c. These stacks include two rows of 22 64K × 1-bit RAM chips as shown. The chips and associated gating circuits are mounted on a daughter board. Each daughter board includes 4, 2 input positive NAND gates (e.g. 210-200 through 210-206 and 210-400 through 210-406) which are connected to receive the row and column timing signals from section 204 and the row decode signals from section 207. Only those chip terminals pertinent to an understanding of the present invention are shown. The remaining terminals, not shown, are connected in a conventional manner. For further information, reference may be made to the co-pending patent application "Rotating Chip Selection Technique and Apparatus", invented by Chester M. Nibby, Jr. and William Panepinto, Jr., Ser. No. 921,292, filed on July 3, 1978 and assigned to the same assignee as named herein.

DESCRIPTION OF OPERATION

Figure 5:
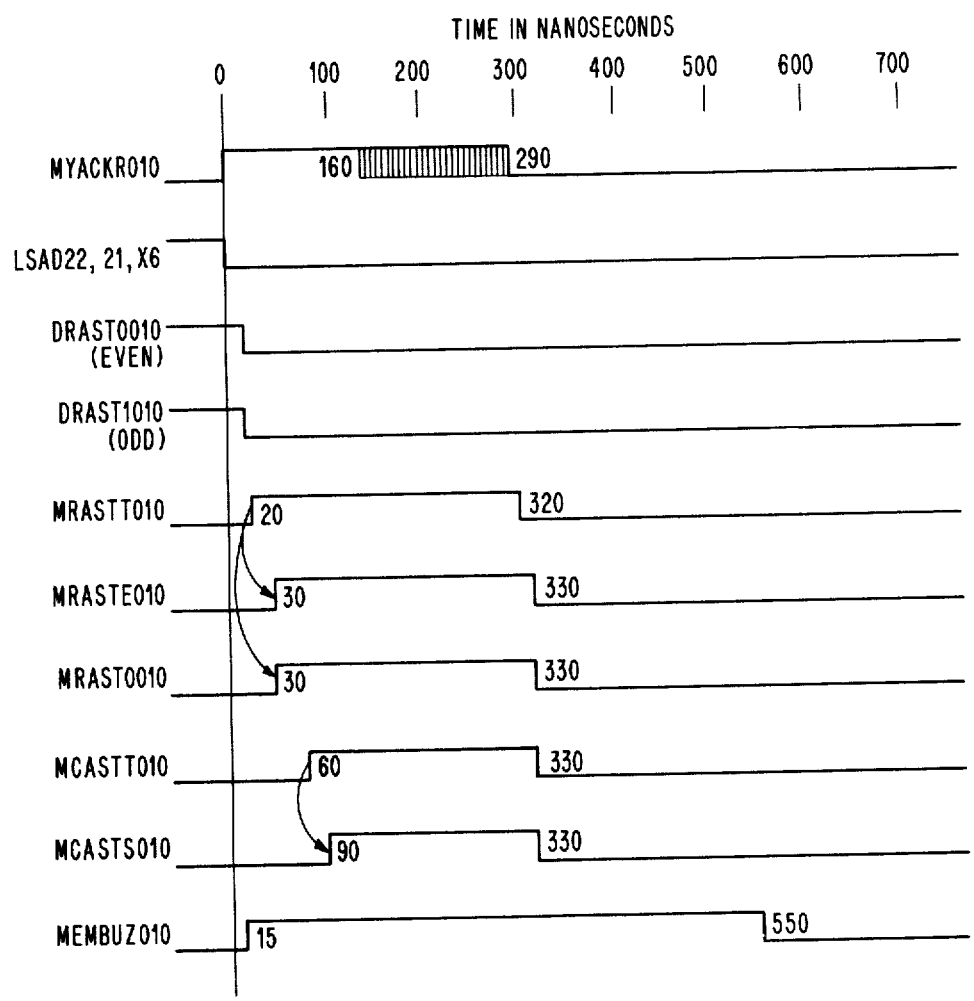
FIG. 5 is a timing diagram used in describing the operation of the present invention.

With reference to FIGS. 1–6b, the operation of the preferred embodiment of the present invention will now be described with particular reference to the timing diagram of FIG. 5. It will be assumed that each of the units 210-2 and 210-4 include a single 128K stack memory unit as shown in FIG. 4c. It will be obvious that each of the units 210-2 and 210-4 can include any number of stack units with the provision that both of the units 210-2 and 210-4 include the same number of stack units.

Figure 6A:
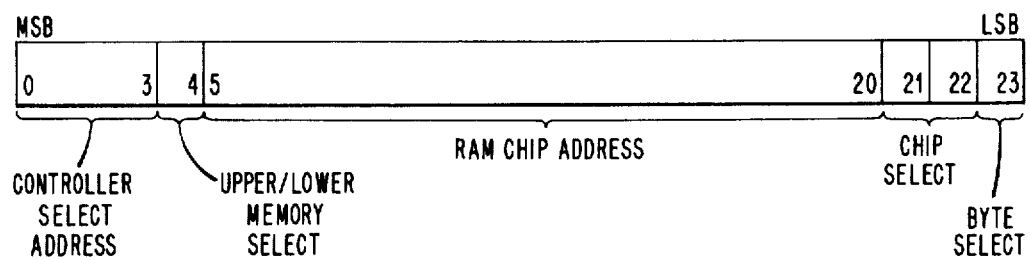
FIG. 6a illustrates the format of the address applied to the memory subsystem of FIG. 1.

Before discussing an example of operation with reference to FIG. 5, reference is first made to FIG. 6a. This Figure illustrates the format of the memory addresses applied to the memory subsystem as part of each memory read or write request. The high order/most significant bit positions are coded to identify the memory module/controller to process the request. Address bit 4 is used to select which 256K half (i.e., upper or lower half) of controller memory is being accessed. Since it is assumed that the memory subsystem 20 includes 256K, address bit 4 is a binary ZERO. These address bits are processed by the circuits of memory subsystem 20 and are not provided to the RAM chips. Processing proceeds in a conventional manner such as disclosed in the above cited copending patent applications.

Address bits 5–20 specify the address of the 22 bit storage location within the RAM chips being addressed. As explained in greater detail herein, these 16 address bits are multiplexed into 8 address inputs and applied via the address buffer circuits of blocks 210-26 and 210-46 to the address input terminals A0–A7 of the RAM chips of FIG. 4c.

According to the teachings of the present invention, the least significant address bits 21–22 are coded to select which row of RAM chips are being addressed. As explained herein in greater detail, these bits are decoded and used to generate a pair of row address strobe (RAS) signals which latch the 8-bit row addresses into the desired row of RAM chips within each memory stack.

FIG. 5 illustrates diagrammatically the relationships between the different timing and control signals generated by the circuits of sections 207 and 204 during a single memory cycle of operation. From FIG. 5, it is seen that the various signals shown are referenced with respect to signal MYACKR010 which starts a memory cycle of operation. It is assumed that subsystem 20 receives a memory command which includes an address having the format of FIG. 6a. This results in the switching of signal MYACKR010 to a binary ONE. The signal MYACKR010 causes the circuits of block 204 to force the memory busy signal MEMBUZO10 to a binary ONE indicating that the memory subsystem has begun a memory cycle of operation (i.e., memory is busy).

In response to the memory busy signal MEMBUZO10, the bus address signals BSAD05210 through BSAD20210 are loaded into row address register 207-40 and column address register 207-42. Also, signal MEMBUZO10 switches signal ADDSTR000 of FIG. 4b to a binary ZERO. This loads the least significant address bit signals BSAD22110 and BSAD21110 in addition to signal BSADX610 into register 207-12.

As seen from FIG. 4b, the stored address signals LSAD22210 and LSAD21210 are decoded by decoder circuit 207-20 which is enabled for operation by signal LSADX6210. By way of example, it is assumed that the address bits 5-20 are all ZEROS. Accordingly, decoder circuit 207-20 forces the zero decode signal DECOD0000 to a binary ZERO. This signal conditions NAND gates 207-24 and 207-26 to force signals DRAST0010 and DRAST1010 to binary ONES. Thus, the decode of 0 results in the simultaneous generation of the pair of row address strobe signals. As seen from FIG. 4c, the signal DRAST0010 is applied as one input of NAND gate 210-206 of the even word stack 210-20. The signal DRAST1010 is applied as one input of NAND gate 210-406 of the odd word stack 210-40. When the timing signals MRASTE010 and MRAST0010 are generated, the NAND gates 210-206 and 210-402 force their outputs to binary ZEROS. This, in turn, results in the storing of the row address signals applied via the address buffer circuits to the terminals A0–A7 of both rows of RAM chips within stacks 210-20 and 210-40.

In greater detail, the timing circuits of FIG. 4a in response to signal MYACKR010 begin a cycle of operation during which timing signals TTAP01010 and TTAP02010 are generated. These signals cause gates 204-1, 204-3, 204-10 and 204-17 to generate signals MRASTR010, MCASTT010, MRASTE010 and MRAST0010, respectively, at the times shown in FIG. 5. As mentioned, the row timing signals MRASTE010 and MRAST0010 together with corresponding ones of the row decode signals DRAST0010 and DRAST1010 generate even and odd row address strobe signals which are applied to the RAS terminals of both rows of RAM chips. At that time, signal MCASTT010 is a binary ZERO. From FIG. 4b, it is seen that the output signal MRASCT000 from NAND gate 207-47 is a binary ZERO at this time (i.e., when signal MCASTT010 is a binary ZERO). This conditions row address register 207-40 to apply the bus address signals at its inputs to its output terminals. Accordingly, both rows of RAM chips latch or store the 8-bit row address signals applied to the A0–A7 terminals.

As seen from FIG. 4a, timing signal MCASTT010 causes delay network 204-19, gates 204-18 and 204-20 to generate signal MCASTS010 at the time shown in FIG. 5. The signal MCASTS010 is applied via NAND gates 210-200, 210-204, 210-400 and 210-404. This results in a column address strobe signal being applied to the CAS terminals of the rows of RAM chips. Accordingly, rows of RAM chips latch or strobe the 8-bit column address signals applied to the A0–A7 terminals.

As seen from FIG. 4b, the above address corresponds to the bus address contents of column address register 207-42. That is, when signal MCASTT010 switches to a binary ONE, signals MRASCT000 and MCASCT000 switch to a binary ONE and binary ZERO respectively. The result is that the bus address signals BSAD05210 and BSAD07210 through BSAD13210 are applied to the output terminals of register 207-42. At the same time, register 207-40 is inhibited from applying bus address signals to its output terminals.

Figure 6B:
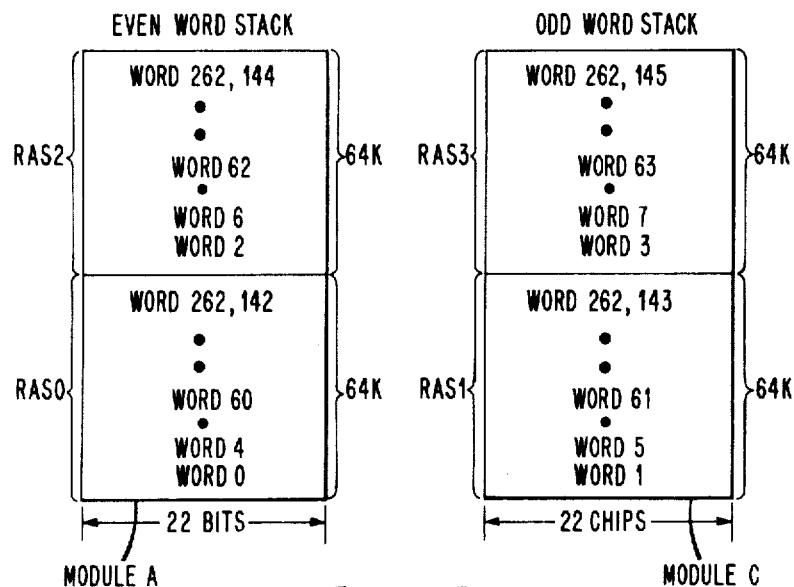
FIG. 6b illustrates the organization of memory modules of FIG. 1.

In the example under consideration, the signal all ZERO memory address causes the contents of the storage locations storing word 0 and word 1 in FIG. 6b defined by the row and column addresses to be accessed. This results in word 0 and word 1 being loaded into the even data and odd data registers 206-8 and 206-10, respectively, in response to signals MDECT000 and MDOCT000. From there, word 0 and word 1 are applied to lines MUXD00-15 and MUXD16-31 of FIG. 3 via the data out multiplexer circuits 206-16 and 206-18. As seen from FIG. 5, the memory cycle of operation is completed when the circuits of section 204 switch the memory busy signal MEMBUZ010 to a binary ZERO.

It will be assumed that central processing unit 40 generates another memory request. The request includes an address having the same value for bits 0-20. However, bits 21-22 are assumed to have the value of "01". Accordingly, it is desired that words 1 and 2 of FIG. 6b be read out onto bus 10.

In accordance with the present invention, another cycle of operation is performed during which a sequence of signals similar to those shown in FIG. 5 are generated. However, signals DRAST1010 and DRAST2010 are generated in lieu of decode row address signals DRAST0010 and DRAST1010, respectively.

This is accomplished as follows. Referring to FIG. 4b, the least significant address bit value "01" causes decoder circuit 207-20 to force the "1" decode output signal DECOD1000 to a binary ZERO. This, in turn, causes NAND gates 207-26 and 207-28 to force simultaneously signals DRAST1010 and DRAST2010 to binary ONES.

Accordingly, the signals DRAST1010 and DRAST2010 together with timing signals MRASTE010 and MRAST0010 load the row address signals applied to the A0-A7 terminals into the RAM chips of rows 1 and 2 of the odd and even memory units 210-40 and 210-20.

Following the loading of the column address signals, words 1 and 2 of FIG. 6b are read out into the odd and even data registers 206-10 and 206-8, respectively.

When the memory request least significant address bits 21-22 have the value "10", words 2 and 3 of FIG. 6b are read out onto bus 10. Again, a memory cycle of operation is performed during which memory subsystem 20 generates another sequence of signals similar to those shown in FIG. 5. However, signals DRAST2010 and DRAST3010 are generated in place of decode row address signals DRAST1010 and DRAST2010.

In greater detail, the decoder circuit 207-20 of FIG. 4b forces the "2" decode output signal DECOD2000 to a binary ZERO. This, in turn, causes NAND gates 207-28 and 207-30 to force simultaneously signals DRAST2010 and DRAST3010 to binary ONES.

Accordingly, the signals DRAST2010 and DRAST3010 together with timing signals MRASTE010 and MRAST0010 load the row address signals applied to the A0-A7 terminals into the RAM chips of rows 2 and 3 of the even and odd memory units 210-20 and 210-40. Thereafter, words 2 and 3 of FIG. 6b are read out to bus 10.

For the least significant address bit values 00 through 10, the RAM chip address bits 5-20 remain the same. However, when the least significant address bits have the value "11", it is desired that words 3 and 4 of FIG. 6b be read out to bus 10. In order to accomplish this, it is necessary to increment by one the chip address bits applied to the even memory unit 210-20.

In greater detail, the least significant address bit value "11" causes decoder circuit 207-20 to force the "3" decode output signal DECOD3000 to a binary ZERO. This, in turn, causes NAND gates 207-30 and 207-24 to force simultaneously signals DRAST3010 and DRAST0010 to binary ONES.

Accordingly, signals DRAST3010 and DRAST0010 together with timing signals MRAST0010 and MRASTE010 load the row address signals applied to the A0-A7 terminals into the RAM chips of rows 0 and 3 of memory units 210-20 and 210-40. However, it will be noted that the row address signals applied to the A0-A7 terminals of the RAM chips of row 0 are incremented by one by adder circuit 207-54 when the least significant address bits 21-22 have the value "11". The RAM chips of row 3 receive the unincremented chip address bits.

Accordingly, words 3 and 4 of FIG. 6b are accessed and read out to bus 10. The remaining words of the memory units 210-20 and 210-40 are accessed in the manner described above.

From the above explanation, it is seen how the apparatus and method of the preferred embodiment of the present invention is able to provide a double word access capability with a minimum of complexity. By having the least significant bits of address specify the row of chips to be accessed, gating circuits can be interconnected to generate simultaneously pairs of row address strobe signals for access both even and odd rows of RAM chips without having to perform additional incrementing and decoding operations.

It will be appreciated by those skilled in the art that many changes may be made to the illustrated embodiment.

For example, the sequential decode apparatus of the present invention may be used with memory module units having any number of rows of chips. Also, the invention may be used to access any number of storage locations within a corresponding number of memory module units. Again, the invention permits accessing to start with any word in any memory module unit. That is, a 4 module system would be organized as follows:

Module 0 contains words 0, 4, . . . ,
Module 1 contains words 1, 5, . . . ,
Module 2 contains words 2, 6, . . . ,
Module 3 contains words 3, 7, . . . .

The number of least significant bits would be increased from 2 to 3. This would provide eight decoder outputs which would be interconnected to 8 four input NAND gates in a manner similar to that previously described. For example, decoder output 0 would connect to NAND gates 0-3, decoder output 1 would connect to NAND gates 1-4, etc. The row address select signals 0 and 4 would connect to the rows of chips in module 0, select signals 1 and 5 would connect to the rows of chips in module 1, etc.

In this module arrangement, the least significant address bits coded to have a value 000 would select words 0 through 3 while the address bit value 001 would select words 1 through 4.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory subsystem for use in a system including a processing unit coupled to a multiword bus in common with said subsystem, said processing unit being operative to generate memory requests on said bus to said subsystem, each of said requests including a multibit address, said memory subsystem comprising:

a plurality of independently addressable memory module units, each memory unit being individually coupled to said multiword bus, said each memory unit including a plurality of rows of random access memory chips;

decode logic circuit means having a number of outputs, said decode logic circuit means generating decode outputs signals at said number of outputs in response to at least significant portion of each said multibit address of each request received from said bus; and gating means having a plurality of inputs and outputs, said outputs being selectively coupled to said plurality of rows of chips of said addressable memory module units and said gating means inputs being selectively connected to said decoder means outputs so as to simultaneously generate at a plurality of sequential row address select signals at a plurality of said outputs in response to each said least significant address portion enabling simultaneous access to a plurality of word locations of said memory module units specified by another more significant portion of each said multibit address during a single bus cycle of operation.

2. The subsystem of claim 1 wherein said subsystem further includes:

a multibit register connected to said bus for storing said least significant address portion of each memory request until the processing of said each request is completed by said memory subsystem.

3. The subsystem of claim 2 wherein said multibit register includes bit storage for a predetermined address bit within each memory request coded for specifying the addressing of a first segment of memory and said decode means further including an enable input connected to said register, said decode means being selectively enabled for operation in accordance with the state of said predetermined address bit.

4. The subsystem of claim 1 wherein said gating means includes a plurality of gate circuit means corresponding in number to said number of outputs, each of said gate circuit means having a plurality of input terminals and an output terminal corresponding to one of said gating means outputs, each input terminal of said gate circuit means being connected in common with an input terminal of at least a different one of said gate circuit means to a different one of said outputs so that a different plurality of said gate circuit means is enabled in response to each decode output signal to generate simultaneously said plurality of row address selection signals in response to said least significant address portion.

5. The subsystem of claim 4 wherein said output terminal of each said gate circuit means connects to all of said chips of a different predetermined one of said rows of a predetermined one of said memory module units for enabling said simultaneous access to a plurality of word locations in said plurality of memory module units.

6. The subsystem of claim 4 wherein said least significant address portion consists of a pair of bits coded for specifying any one of four rows of random access chips as a first word location of a pair to be accessed.

7. The subsystem of claim 6 wherein one of said gate circuit means connected to the row of one of said memory module units specified by the coding of said least significant address bits is conditioned in response to said each decode signal from said decode logic circuit means to generate one of said pair of row address selection signals and another one of said gate circuit means connected to receive the same decode signal generates the other one of said pair of row address signals for selecting the next sequential row of random access chips within the other memory module unit for enabling access to a second word location of said pair.

8. The subsystem of claim 7 wherein said four rows correspond to rows 0–3 and said least significant address bits have the value 00, said decode logic circuit means generating a first decode signal in response to said 00 value conditioning first and second ones of said plurality of gate circuit means connected to the random access chips of rows 0 and 1 to generate said pair of row address selection signals.

9. The subsystem of claim 7 wherein said four rows correspond to rows 0–3 and said least significant address bits have the value 01, said decode logic circuit means generating a second decode signal in response to said 01 value conditioning second and third ones of said plurality of gate circuit means connected to the random access chips of rows 1 and 2 to generate said pair of row address selection signals.

10. The subsystem of claim 7 wherein said four rows correspond to rows 0–3 and said least significant address bits have the value 10, said decode logic circuit means generating a third decode signal in response to said 10 value conditioning third and fourth ones of said plurality of gate circuit means connected to the random access chips within rows 2 and 3 to generate said pair of row address selection signals.

11. The subsystem of claim 7 wherein said four rows correspond to rows 0–3 and said least significant address bits have the value 11, said decoder means generating a fourth decode signal in response to said 11 value conditioning fourth and said first ones of said plurality of said gate circuit means connected to the random access chips of rows 3 and 0 to generate said pair of row address selection signals.

12. The subsystem of claim 7 wherein each of said gate circuit means performs a predetermined logical operation upon said decode output signal applied to each of said input terminals.

13. The subsystem of claim 12 wherein said predetermined logical operation performed by each said gate circuit means is an OR operation.

14. The subsystem of claim 13 wherein each said gate circuit means is constructed from a NAND gate.

15. A memory subsystem for use in a system including a processing unit coupled to a multiword bus in common with said subsystem for transfer of information therebetween during bus cycles of operation, said unit being operative to generate memory requests on said bus to said subsystem, each of said requests including a multibit address, said memory subsystem comprising:

a pair of independently addressable memory module units, each memory unit being individually coupled to said multiword bus, said each memory unit including a plurality of rows of random access memory chips;

row address selection means coupled to said bus for generating row address selection signals in response to a least significant bit portion of each address, said row selection means including:

decoder means having a number of outputs, said decoder means being operatively coupled to said bus for generating a number of decode output signals at different ones of said number of outputs in response to said least significant portion of each said address of each request received from said bus; and gating means having a plurality of inputs and outputs, said outputs being selectively coupled to said plurality of rows of chips of said addressable memory module units and said gating means inputs being selectively connected to said decoder means outputs so as to simultaneously generate a pair of sequential row address select signals at a pair of said outputs in response to said least significant portion of each said address enabling the simultaneous access to a pair of word locations of said memory module units specified by another more significant bit portion of each said address during a single bus cycle of operation.

16. The subsystem of claim 15 wherein said row address selection means further includes:

a multibit register connected to said bus for storing said least significant address portion of each memory request until the processing of said each request is completed by said memory subsystem.

17. The subsystem of claim 15 wherein said gating means includes a plurality of gate circuit means corresponding in number to said number of decoder outputs, each of said gate circuit means having a pair of input terminals and an output terminal corresponding to one of said gating means outputs, each input terminal of said gating means being connected in common with an input terminal of a different one of said gating means to a different one of said decoder outputs so that a different pair of said gate circuit means is enabled in response to each decode signal to generate simultaneously said pair of row address selection signals in response to said least significant address portion.

18. The subsystem of claim 17 wherein said output terminal of each said gate circuit means connects to all of said chips of a different predetermined one of said rows of a predetermined one of said memory module units for enabling said simultaneous access of a pair of word locations in said pair of memory module units.

19. The subsystem of claim 17 wherein said least significant address portion consists of a pair of bits coded for specifying any one of four rows of random access chips as a first word location of said pair to be accessed in said pair of memory module units.

20. The subsystem of claim 19 wherein one of said gate circuit means connected to the row of one of said memory module units specified by the coding of said least significant address bits is conditioned in response to said each decode signal from said decoder means to generate one of said pair of row address selection signals and another one of said gate circuit means connected to receive the same decode signal generates the other one of said pair of row address signals for selecting the next sequential row of random access chips within the other memory module unit for access to a second word location of said pair.

21. The subsystem of claim 19 wherein said four rows correspond to rows 0-3 and said least significant address bits have the value 00, said decoder means generating a first decode signal in response to said 00 value conditioning first and second ones of said plurality of gate circuit means connected to the random access chips of rows 0 and 1 to generate said pair of row address selection signals.

22. The subsystem of claim 19 wherein said four rows correspond to rows 0-3 and said least significant address bits have the value 01, said decoder means generating a second decode signal in response to said 01 value conditioning second and third ones of said plurality of gate circuit means connected to the random access chips of rows 1 and 2 to generate said pair of sequential row address selection signals.

23. The subsystem of claim 19 wherein said four rows correspond to rows 0-3 and said least significant address bits have the value 10, said decoder means generating a third decode signal in response to said 10 value conditioning third and fourth ones of said plurality of gate circuit means connected to the random access chips of rows 2 and 3 to generate said pair of sequential row address selection signals.

24. The subsystem of claim 19 wherein said four rows correspond to rows 0-3 and said least significant address bits have the value 11, said decoder means generating a fourth decode signal in response to said 11 value conditioning fourth and first ones of said plurality of said gate circuit means connected to the random access chips of rows 3 and 0 to generate said pair of sequential row address selection signals.

25. A memory subsystem for use in a system including a processing unit coupled to a multiword bus in common with said subsystem for transfer of data words therebetween during bus cycles of operation, said unit being operative to generate memory requests on said bus to said subsystem, each of said requests including a multibit address coded to specify a storage location within said memory subsystem to be accessed, said subsystem comprising:

a plurality of independently addressable memory module units, each memory unit being individually coupled to different sections of said multiword bus, each memory unit including a plurality of rows of random access memory chips, for providing storage of data words, at least one module unit including the even numbered rows containing storage locations having even addresses and at least one other module unit including the odd numbered rows containing storage locations having odd addresses;

row selection apparatus coupled to said bus for receiving a least significant bit portion of said address, said row selection apparatus including:

a register connected to said bus for storing said least significant address portion of each memory request until processed by said subsystem;

a decoder circuit having a plurality of inputs and N number of outputs, said plurality of inputs being coupled to said register to receive said least significant address portion and generate an output signal on one of said N number of outputs; and, gating means having a plurality of inputs and N number of outputs, the even numbered outputs being connected to corresponding ones of said even numbered rows of chips of said one module unit and the odd numbered outputs being connected to said odd numbered rows of said other module unit and different pluralities of said plurality of inputs being connected in common to a different decoder output so as to simultaneously generate an output signal at even and odd numbered outputs in response to the decoding of each said least significant portion by said decoder circuit enabling simultaneous access to even and odd storage locations of corresponding even and odd numbered rows of chips within said memory modules units specified by another more significant bit address portion of said address during a single bus cycle of operation.

26. The subsystem of claim 25 wherein said multibit register includes bit storage for a predetermined address bit within each memory request coded for specifying the addressing of a first segment of memory and said decode means further including an enable input connected to said register, said decode means being selectively enabled for operation in accordance with the state of said predetermined address bit.

27. The subsystem of claim 26 wherein said multibit register includes bit storage for a predetermined address bit within each memory request coded for specifying which half of memory is being addressed and said decoder circuit further including an enable input connected to said multibit register, said decoder circuit being selectively enabled for operation in accordance with the state of said predetermined address bit.

28. The subsystem of claim 25 wherein said gating means includes N number of gate circuit means, each of said gate circuit means having a plurality of input terminals and an output terminal corresponding to one of said gating means outputs, each input terminal of said gate circuit means being connected in common with an input terminal of at least a different one of said gate circuit means to a different one of said decoder outputs so that a different plurality of said gate circuit means connected to even and odd numbered rows of chips is enabled in response to each decode signal to generate simultaneously said plurality of row address selection signals in response to said least significant address portion.

29. The subsystem of claim 28 wherein said least significant address portion consists of a pair of bits coded for specifying any one of four rows of random access chips as containing a first word location of said pair to be accessed in said pair of memory module units.

30. The subsystem of claim 29 wherein one of said gate circuit means connected to an even row of said one memory module unit when specified by the coding of said least significant address bits is conditioned in response to said each decode signal from said decoder means to generate one of said pair of row address selection signals at one of said even numbered outputs and another one of said gate circuit means connected to receive the same decode signal generates the other one of said pair of row address signals at one of said odd numbered outputs for selecting the next sequential row of random access chips within said other memory module unit for accessing a second word location of said pair.

31. The subsystem of claim 29 wherein said four rows correspond to rows 0-3 and said least significant address bits have the value 00, said decoder means generating a first decode signal in response to said 00 value conditioning first and second ones of said N number of gate circuit means connected to the random access chips of rows 0 and 1 to generate simultaneously odd and even row address selection signals.

32. The subsystem of claim 29 wherein said four rows correspond to rows 0-3 and said least significant address bits have the value 01, said decoder means generating a second decode signal in response to said 01 value conditioning second and third ones of said N number of gate circuit means connected to the random access chips of rows 1 and 2 to generate simultaneously odd and even row address selection signals.

33. The subsystem of claim 29 wherein said four rows correspond to rows 0-3 and said least significant address bits have the value 10, said decoder means generating a third decode signal in response to said 10 value conditioning third and fourth ones of said N number of gate circuit means connected to the random access chips of rows 2 and 3 to generate simultaneously odd and even row address selection signals.

34. The subsystem of claim 29 wherein said four rows correspond to rows 0-3 and said least significant address bits have the value 11, said decoder means generating a fourth decode signal in response to said 11 value conditioning fourth and first ones of said N number of said gate circuit means connected to the random access chips of rows 3 and 0 to generate simultaneously odd and even row address selection signals.

35. The subsystem of claim 29 wherein each of said N number of gate circuit means performs a predetermined logical operation upon said decode output signal applied to each of said input terminals.

36. The subsystem of claim 35 wherein said predetermined logical operation performed by each gate circuit means is an OR operation.

37. A memory subsystem for use in a system including a processing unit coupled to a multiword bus in common with said subsystem for transfer of data words therebetween during bus cycles of operation, said unit being operative to generate memory requests on said bus to said subsystem, each of said requests including a multibit address coded to specify a storage location within said memory subsystem to be accessed, said subsystem comprising:

N number of independently addressable memory module units, each memory unit being individually coupled to different sections of said multiword bus, each memory unit including a plurality of rows of random access memory chips, for providing storage of data words, N/2 module units including the even numbered rows containing storage locations having even addresses and N/2 module units including the odd numbered rows containing storage locations having odd addresses;

row selection apparatus coupled to said bus for receiving a least significant bit portion of said address, said row selection apparatus including:
a register connected to said bus for storing said least significant address portion of each memory request address until processed by said subsystem;
a decoder circuit having a plurality of inputs and M number of outputs, said plurality of inputs being coupled to said register to receive said least significant address portion and generate an output signal on one of said M number of outputs; and,
gating means having said M number of inputs and M number of outputs, the even numbered outputs being connected to corresponding ones of said even numbered rows of chips of said N/2 module units and odd numbered outputs being connected to said odd numbered rows of said N/2 module units and N number of said M number of inputs being connected in common to a different decoder output so as to simultaneously generate an output signal at even and odd numbered outputs in response to the decoding of each said least significant portion by said decoder circuit enabling simultaneous access to even and odd storage locations of corresponding even and odd numbered rows of chips within said memory modules units specified by another more significant portion of said request address during a single bus cycle of operation.

38. The subsystem of claim 37 wherein said gating means includes M number of gate circuit means, each of said gate circuit means having an N input terminal and an output terminal corresponding to one of said gating means outputs, each input terminal of said gate circuit means being connected in common with an input terminal of N−1 number of said gate circuit means to a different one of said decoder outputs so that said N number of said gate circuit means connected to N/2 even and N/2 odd numbered rows of chips are enabled in response to each decode signal to generate simultaneously said N number of row address selection signals in response to said least significant address portion.

* * * * *